(12) United States Patent
Vasey

(10) Patent No.: US 8,745,050 B2
(45) Date of Patent: Jun. 3, 2014

(54) DEFINITIONS IN MASTER DOCUMENTS

(75) Inventor: Philip E. Vasey, Southwold (GB)

(73) Assignee: Business Integrity Limited, London (GB)

( * ) Notice: Subject to any disclaimer, the term of this patent is extended or adjusted under 35 U.S.C. 154(b) by 1264 days.

(21) Appl. No.: 11/669,204

(22) Filed: Jan. 31, 2007

(65) Prior Publication Data

US 2007/0192355 A1 Aug. 16, 2007

Related U.S. Application Data

(60) Provisional application No. 60/763,821, filed on Jan. 31, 2006.

(51) Int. Cl.
*G06F 7/00* (2006.01)
*G06F 17/30* (2006.01)
*G06F 17/00* (2006.01)

(52) U.S. Cl.
USPC .......................................... 707/736; 707/603

(58) Field of Classification Search
None
See application file for complete search history.

(56) References Cited

U.S. PATENT DOCUMENTS

| | | | |
|---|---|---|---|
| 6,182,095 B1 * | 1/2001 | Leymaster et al. | 715/236 |
| 6,996,769 B1 * | 2/2006 | Peikes et al. | 715/205 |
| 2001/0013047 A1 * | 8/2001 | Marques | 707/536 |
| 2002/0059278 A1 * | 5/2002 | Bailey et al. | 707/100 |
| 2003/0037038 A1 | 2/2003 | Block | |
| 2004/0205615 A1 | 10/2004 | Birder | |
| 2005/0096910 A1 | 5/2005 | Watson | |
| 2005/0210051 A1 * | 9/2005 | Novak et al. | 707/100 |
| 2005/0268222 A1 * | 12/2005 | Cheng | 715/513 |
| 2006/0007466 A1 * | 1/2006 | Ben-Yehuda et al. | 358/1.13 |
| 2008/0005154 A1 * | 1/2008 | Fujimaki | 707/102 |

FOREIGN PATENT DOCUMENTS

WO  WO02/01386 A1  1/2002

OTHER PUBLICATIONS

GB0701752.8 Search Report.

* cited by examiner

*Primary Examiner* — Rehana Perveen
*Assistant Examiner* — Raheem Hoffler
(74) *Attorney, Agent, or Firm* — Anderson Groecki & Rouille LLP

(57) ABSTRACT

The present invention relates to the generation of customised documents using document templates or master documents in a document generation system. In particular, the present invention relates to master documents requiring information specifying various definitions used in the document generation process.

11 Claims, 2 Drawing Sheets

9 — Retrieve a dictionary file referenced in a master document.

11 — Generate a customised document from the master document using definitions specified in the dictionary file.

DEFINITIONS IN MASTER DOCUMENTS

CROSS-REFERENCE TO RELATED APPLICATIONS

A claim of priority is made to U.S. Provisional Patent Application 60/763821, titled Definitions in Master Documents, filed Jan. 31, 2006, which is incorporated by reference.

FIELD OF THE INVENTION

The present invention relates to the generation of customised documents using document templates or master documents in a document generation system. In particular, the present invention relates to master documents requiring information specifying various definitions used in the document generation process.

BACKGROUND OF THE INVENTION

It is known to create customised documents using document templates or master documents. In our system, customised documents are generated using master documents which contain portions of document content, such as text or images, which are selectively incorporated into the resulting customised documents. For example, portions of document content included in the master document may be included in the final customised document only if certain conditions are satisfied. Such portions of document content may be referred to as conditional document content. The master document may also include portions of document content which are included unconditionally in the final customised document.

In one example, a social services document customised to a particular person who is the subject of the document may be generated from a master document. If the subject is pregnant then the final document may need to include a portion of text relating to the pregnancy. In this case the master document contains a specific text portion relating to pregnancy which is only included in the final customised document if it has been determined that the subject is actually pregnant. The final document may also need to include a standard clause which is included regardless of pregnancy but whose wording differs depending on whether the subject is male or female. In this case, the master document contains two text portions corresponding to the alternative clause wordings. One or the other of the two text portions is selectively included in the customised document depending on whether the subject is male or female.

The information required to generate a customised document may be represented by one or more variables. In the examples given above, a first variable 'Pregnant' which can take one of the two values 'True' or 'False' is used to represent whether the subject is pregnant or not. A second variable 'Gender' which can take one of the two values 'Male' or 'Female' is used to represent the gender of the subject. In our system, the variables may also take values indicating that the value of a variable is unknown or indefinite.

The variables associated with a master document may be used to form logical statements which may in turn be used to specify the conditions which need to be satisfied for each portion of document content to be included in the customised document. For example, the logical statement Gender IS 'Female' may be formed which evaluates to True if the subject is female and evaluates to False if the subject is male. This logical statement represents the condition which must be satisfied (i.e. evaluate to True) for the standard clause relating to female subjects to be included in the customised document.

The simplest logical statement is a variable such as 'Pregnant', which can take the values True and False, appearing on its own. In this case the evaluation of the logical statement is simply the value of the variable. Such a variable, 'Variable', appearing on its own as a logical statement may be considered to be shorthand for Variable IS 'True'. More complicated logical statements may also be formed by combining simpler statements using the logical operators AND, OR and NOT. For example, the logical statement (Gender IS 'Female') AND NOT(Pregnant) may be formed which evaluates to True only if the subject is female and not pregnant. The conditions (in the form of logical statements) which dictate whether particular portions of document content are included in the customised document may be referred to as usage statements.

The way in which portions of document content are incorporated into customised documents may be represented in the form of a mark-up of the master document. For example, a portion of conditional text in the master document may be indicated as such by enclosing the text in square bracket, [ ... conditional text ... ]. The usage statement associated with a particular portion of document content is indicated as superscript on the inside of the left-hand bracket associated with the portion of document content, [$^{Usage\ Statement}$ ... conditional text ... ]. The conditional document content is included in the customised document only if the usage statement associated with that conditional document content evaluates to True. For example, the mark-up [$^{Gender\ IS\ 'Male'}$ Text portion 1 ... ] indicates that the text 'Text portion 1 ... ' is included in the customised document only if the subject is male. Similarly, the mark-up [$^{Pregnant}$ Text portion 2 ... ] indicates that the text 'Text portion 2 ... ' is included in the customised document only if the subject is pregnant. In the example given above where alternative clause wordings are used depending on whether the subject is male or female, the master document contains [$^{Gender\ IS\ 'Male'}$ Clause wording 1 ... ] [$^{Gender\ IS\ 'Female'}$ Clause wording 2 ... ]. The position of the document content in the customised document depends on the position of the document content within the master document.

Variables such as 'Name' or 'Address' may also appear in the text portions. When a variable appears within a portion of text, the variable may be distinguished from the rest of the text by being shown between curly brackets, {variable}. One example of a conditional text portion illustrating this is [$^{Pregnant}$ The mother is {Name} who lives at {Address} ... ].

In our system, in some cases, where particular predefined portions of document content, such as standard clauses need to appear in several master documents, it is often more convenient to store such portions of document content in separate files. For example, a clause file may be provided which contains several conditional portions of document content representing variant wordings of a standard clause, one of which is eventually chosen to appear in a customised document. The selection of a particular variant of clause wording is controlled by one or more generic variables or usage tags appearing in the clause file. Each master document can separately define the meaning of the usage tags to allow the standard clauses to be used in different ways by different master documents.

For example, in the case of a governing law clause in a legal contract, the three usage tags 'USA', 'Europe' and 'Rest of World' may be used. One exemplary clause file contains the following portions of conditional text.

[$^{USA}$ This agreement is governed by the laws of the United States of America.]

[$^{Europe}$ This agreement is governed by the laws of the European Union.]

[*Rest of World* This agreement is not governed by any specific jurisdiction.]

The portions of conditional text which are included in the customised document cannot be determined until the usage tags are defined. In one master document the usage tags may be defined for example in terms of usage statements involving the specific variable 'SalesOffice' as follows.

USA SalesOffice IS 'NewYork'
Europe SalesOffice IS 'London' OR Sales Office IS 'Paris'
Rest of World SalesOffice IS 'Other'

In another master document the usage tags may be defined differently in terms of usage statements involving the specific variable 'Sales Region', for example as follows.

USA SalesRegion IS 'North America'
Europe SalesRegion IS NOT 'North America'
Rest of World FALSE When a master document uses a standard clause, the relevant clause file is identified in the master document at the location at which the clause is to appear using the mark-up {include CLAUSE_FILE_NAME} comprising the 'include' command. Then, when the master document is processed to create a customised document, at the specified point, the contents of the clause file are inserted into the master document. The usage tags are then replaced with their definitions specified in the master document. After this process has been carried out, the master document can be processed normally.

Items such as portions of document content, variables, usage statements and commands may be referred to collectively as document elements.

Although the examples given above represents one form of mark-up, other forms of mark-up may also be used. Our U.S. patent application Ser. No. 10/434,753, incorporated herein by reference, discloses two different forms of mark-up notation and a system and method for converting a master document written in one mark-up notation to a master document written in a different mark-up notation. More complex mark-up notation may also be used. For example, our International patent applications, publication numbers WO 2005/024653, WO 2005/024654, WO 2005/024656 and WO 2005/024660, incorporated herein by reference, disclose several examples.

In order to generate a fully customised document it is necessary to determine the values of all the relevant variables so that the usage statements can be evaluated which in turn allows a determination to be made as to which of the portions of conditional document content to include in the final customised document. This information may be collected by means of a questionnaire which a user completes to assign values to the variables. In the social services examples given above, a user may be asked a first question enquiring as to the gender of the subject. If relevant, a second question may then be asked enquiring as to whether the subject is pregnant. The questionnaire may be presented to the user in the form of a series of web pages for example in which the user types answers into text boxes or checks tick boxes corresponding to predefined alternative answers.

The questionnaire may be generated automatically by analysing the master document and determining from the mark-up and the variables present which questions to ask. Our International patent applications, publication numbers WO 01/04772 and WO 03/061474, incorporated herein by reference, disclose systems and methods for generating a questionnaire from a master document.

In our system, a master document may contain a description of the attributes of the variables used in the master document. This information may be used to assist in the generation of the questionnaire used to collect information relating to variables.

For example, the variable attribute description for a variable may comprise the name of the variable, an alias for the variable and a questionnaire prompt, specified respectively in 'name', 'alias' and 'prompt fields'. The prompt, for example in the form of a question, is displayed in the questionnaire to a user to prompt the user to provide the necessary information. The alias may be displayed next to the prompt to indicate to the user which variable the question relates to.

The variable attribute description may also comprise a 'type' field containing information specifying the type of input required from a user completing the questionnaire to assign a value to a variable. This could specify for example 'select' if a user is required to make a selection from one or more predefined alternative answers, or 'date' if a user is required to enter a date in a text box. The questionnaire may use the type field to properly configure the input interface for each question. Where the input type is 'select' the variable attribute description may comprise a selection field which specifies the possible selections that can be made.

The variable attribute description may also comprise a form field which specifies any relevant restrictions on the input. For example, if the type of input is 'select' then the form field may specify 'single' indicating that the user input is restricted to making exactly one selection. Alternatively, the form field may specify that the user may make two or more selections. In another example, when the type of input is 'number' then the form field may specify that an integer is required.

One exemplary variable attribute description for the variable 'SalesOffice' is the following.

| Name | Alias | Prompt | Type | Form | Selections |
|---|---|---|---|---|---|
| SalesOffice | Sales Office | Select the sales office: | select | single | New York London Paris Other |

It can be seen from the above description that various definitions and other information are used in the document generation process. Examples of such definitions and other information include a list of the variables used in the master document, and information about them, such as the variable attribute descriptions. Other examples include usage tag definitions and information regarding the specific formatting of customised documents generated from the master document. Other examples of information used in the document generation process will readily occur to the skilled person. This information may be stored in a special section of the master document, which may be referred to as a master document dictionary, or dictionary for short.

In some cases, a customised document may be generated from several master documents. This may be the case for example where the document structure is complex so that it is more convenient to generate the customised document from several inter-related sub-documents rather than a single master document. In this case each master document used in the document generation process uses an identical dictionary.

One problem with known techniques when a customised document is generated from several master documents is that when a dictionary needs to be modified, the dictionary section in each separate master document needs to be identically modified. This increases the time and difficulty in maintaining the document generation system and increases the chances of errors occurring.

DETAILED DESCRIPTION OF PREFERRED EMBODIMENTS

Figure 1:
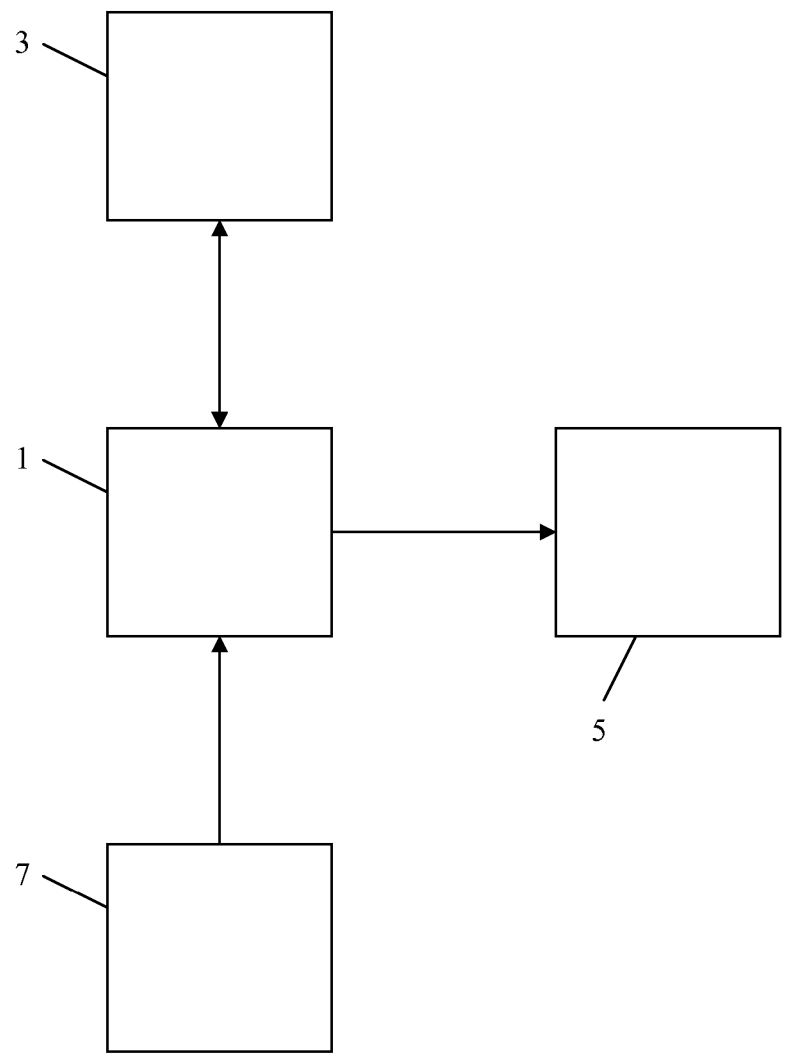
FIG. 1 is a schematic diagram of a system in which the invention may be employed.

We have appreciated that a master document dictionary need not be contained in the master document itself, but rather could be defined in a separate dictionary file which each master using the dictionary references. In this way, where a customised document is generated from several different master documents, each of the master documents may reference the same dictionary file. Then, if the dictionary needs to be modified, it is only necessary to modify the single dictionary file rather than multiple dictionaries replicated in each master document. One advantage of this technique is that modification and maintenance is greatly simplified saving time and effort.

In one embodiment, a master document may use a specific dictionary by including a command, for example contained in a header of the master document. For example, a master document may use the dictionary stored in the file named DICTIONARY_FILE by including the command {dictionary DICTIONARY_FILE}. When a master document is processed, the dictionary command is carried out which causes the specified dictionary to be retrieved and loaded by the document generation system.

One example in which the dictionary may need to be changed is where the usage tag definitions used in a master document need to be modified. In another example, if it is desired to modify the document generation system to allow users speaking different languages to generate customised documents, it is necessary to modify the language used in the document generation process. For example, it may be necessary to modify the questionnaire to display various information and ask questions in the appropriate language. This may be achieved for example by translating the variable aliases, prompts and selections specified in the variable attribute descriptions which define what is presented to a user completing the questionnaire. Since the variable attribute descriptions are contained in the dictionary file, using the present invention, modifying the language used in the single dictionary file modifies the language used in each master document which uses that dictionary file. In contrast, with prior systems, the language used in the dictionary sections of multiple master documents would need to be modified separately.

In another embodiment, rather than specifying a dictionary file using a file name, the master document comprises a reference to a particular region of memory of the document generation system. In this way, whichever dictionary file is stored in the specified region of memory is used as the dictionary file. Using this technique, a dictionary may easily be switched by loading different dictionaries into the specified region of memory. For example, several dictionaries, differing in their language usage, may be provided. The present invention allows the language to be easily switched simply by loading the appropriate dictionary file into the region of memory.

Since the language of the dictionary is changed, but not the language of the document content contained in the master document, this allows a user using one language to understand and complete the questionnaire in that language but to generate a customised document in a different language.

Where a master document comprises its own dictionary, the master may be separated into two sections. The first section, referred to as the body section, comprises portions of document content marked-up according to a predetermined syntax together with other document elements. The second section, referred to as the dictionary section, comprises the dictionary definitions and other information. In one embodiment of the present invention, a dictionary file comprises a master document comprising a body section and a dictionary section. The dictionary section contains all the necessary dictionary definitions and other information, but the body section is empty. Using this format, a dictionary file may be created easily from an existing master document having its own dictionary simply by deleting the contents of the body section. Using the same file format as that of masters comprising their own dictionary also assists in compatibility with earlier systems.

In the embodiments described above, the dictionary referenced by the master documents is in the form of a single file. However it is understood that a dictionary may also be in the form of a plurality of separate files for example each specifying different definitions and information. In this case, each master document may reference one or more of the dictionary files so that all necessary definitions and information is available. Using this technique variations of dictionaries may be used by selecting the appropriate combination of separate dictionary files. It is understood that master documents comprising a dictionary may be used together with master documents which use separate dictionary files.

The present invention may be implemented on any suitable computer system. One suitable computer system, illustrated in FIG. 1, comprises a processor 1, a memory 3, a display 5 such as a VDU, and one or more input devices 7 such as a keyboard and mouse. The memory 3 is arranged to store various data used in the system, and computer executable code which is executed by the processor 1 to perform various method steps and other processes. The display 5 is used to present a user interface and any other visual information to a user. The input devices 7 may be used to input information into the system.

A master document stored as a file may be stored and retrieved using any suitable file storage and retrieval system. The user retrieves a master document which may then be presented to the user on the user interface. If it is desired to generate a customised document from the master document, the user selects a 'generate customised document' icon causing the processor 1 to process the master document. The processor 1 executes the dictionary command specified in the master document causing the specified dictionary file to be retrieved and loaded. The system then generates a questionnaire by analysing the master document and displays the questionnaire to the user for input of information.

The resulting questionnaire may be in the form of a web page created using HTML for example. The questionnaire may be completed by inputting various information in response to a series of questions presented on the display 5. The user may input information using the input devices 7 for example by typing text into text boxes, by selecting buttons corresponding to different options and so on. The user may also navigate forwards and backwards through the questionnaire amending their answers to the questions. In some embodiments, the questionnaire web page may be accessed independently from several computers connected together by a network. This allows different users to complete different parts of the questionnaire more easily. In some embodiments, the information required to answer some questions may be provided from an external database or other information source.

A master document or dictionary file used in the system may be implemented for example in the form of a Microsoft Word document. The mark-up used in the master documents may be represented for example by the formatting features of Microsoft Word such as superscript.

Figure 2:
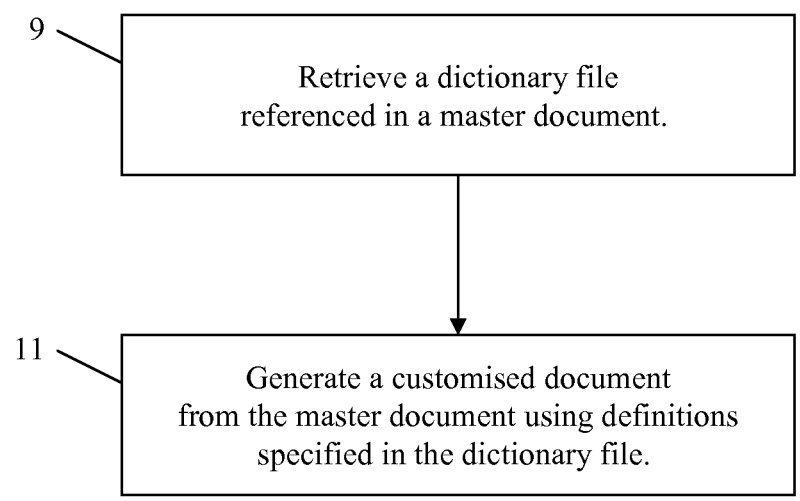
FIG. 2 is a flow chart of a method according to the invention.

An exemplary method for generating a customised document, illustrated in FIG. 2 comprises a first step 9 of retrieving a dictionary file referenced in a master document and a second step 11 of generating a customised document from the master document using definitions specified in the dictionary file.

The invention claimed is:

1. A document generation system including software stored on a computer-readable medium which, when employed as a computer component, generates a customised document using a plurality of master documents, the system comprising:
   an interface for receiving input from a user in response to at least one question;
   a dictionary file stored in tangible form, the dictionary file being referenced by each one of the plurality of master documents; and
   a processor that retrieves the dictionary file referenced by each one of the master documents, the dictionary file comprising definitions used in ones of the plurality of master documents, the definitions including a list of variables which represent information needed to determine whether corresponding text is to be included in the customized document in order to achieve a specific meaning, the processor generating the customized document in tangible form based on the input from the user, text from ones of the master documents, and the definitions from the dictionary file, by utilizing the user input to provide the information needed to determine whether text is to be included in the customized document.

2. The document generation system of claim 1 in which the document generation system generates the customised document using a plurality of dictionary files, each master document of the plurality of master documents referencing the same dictionary files of the plurality of dictionary files.

3. The document generation system of claim 1 in which the dictionary file comprises a first section comprising the definitions and a second empty section.

4. The document generation system of claim 1 in which the definitions include the definitions of one or more generic variables.

5. The document generation system of claim 1 in which the definitions include one or more variable attribute descriptions.

6. The document generation system of claim 5 in which the variable attribute descriptions are used to configure a questionnaire used to collect the input from the user.

7. The document generation system of claim 1 in which the definitions include information used to format the customised document.

8. An improved set of master documents fixed in tangible form on a computer-readable medium, the master documents of a type used to generate customised documents in tangible form based on information input by a user, the customized documents generated by a document generation system, the improvement comprising:
   in each one of a plurality of master documents of the set of master documents, a reference to a common dictionary file, the common dictionary file comprising definitions used in the master documents, the definitions including a list of variables which represent information needed to determine whether corresponding text is to be included in the customized documents in order to achieve a specific meaning, whereby updating the definitions used in the master documents does not require modification of dictionaries uniquely associated with individual master documents.

9. An improved dictionary file fixed in tangible form on a computer-readable medium for use in a document generation system, the improvement comprising:
   definitions used in each of a plurality of master documents to generate a customized document in tangible form in response to user input, the definitions including a list of variables which represent information needed to determine whether corresponding text is to be included in the customized document in order to achieve a specific meaning, the dictionary file being retrievable by the document generation system in response to a reference to the dictionary file in each master document of the plurality of master documents.

10. A method for generating a customised document using a computer and document generation software stored on a computer readable medium which, when employed as a computer component, generates the customized document by performing steps comprising:
   receiving input from a user;
   retrieving a dictionary file referenced in each one of a plurality of master documents, the dictionary file including definitions comprising a list of variables which represent information needed to determine whether corresponding text is to be included in the customized document in order to achieve a specific meaning; and
   generating a customised document in tangible form from the plurality of master documents using definitions specified in the dictionary file and the input from the user.

11. A computer program product stored on a physical medium having software recorded thereon which, when executed by a computer, causes the computer to undertake the method of claim 10.

* * * * *